United States Patent [19]

Marmur

[11] Patent Number: 5,203,668
[45] Date of Patent: Apr. 20, 1993

[54] APPARATUS FOR LOADING AND UNLOADING OF A CONTAINER STRUCTURE OR OTHER LOADS WITH RESPECT TO A TRUCK BODY OR TRAILER

[75] Inventor: Lazar Marmur, 6608 Ravens Crest Dr., Plainsboro, N.J. 08536

[73] Assignees: E. Fisher; L. Marmur; F. Fisher; W. Kimble

[21] Appl. No.: 710,878

[22] Filed: Jun. 6, 1991

[51] Int. Cl.[5] .................................................. B60P 1/28
[52] U.S. Cl. .................................... 414/500; 414/480; 414/494; 414/538
[58] Field of Search .............. 414/473, 480, 491, 494, 414/500, 538, 556, 559, 571

[56] References Cited

U.S. PATENT DOCUMENTS

| | | |
|---|---|---|
| 1,919,325 | 7/1933 | Frick et al. . |
| 2,789,715 | 4/1957 | Filipoff et al. . |
| 2,831,588 | 4/1958 | Seed . |
| 3,032,217 | 5/1962 | Musson et al. . |
| 3,139,289 | 6/1964 | Richler . |
| 3,195,956 | 7/1965 | Kou . |
| 3,259,255 | 7/1966 | Cresci . |
| 3,322,396 | 5/1967 | Hubbard . |
| 3,333,715 | 8/1967 | Hepburn et al. . |
| 3,404,792 | 10/1968 | Frieberg . |
| 3,467,268 | 9/1969 | Corompt . |
| 3,484,004 | 12/1969 | Hughey . |
| 3,499,678 | 3/1970 | Richler . |
| 3,501,031 | 3/1970 | Whitfield . |
| 3,501,035 | 3/1970 | Whiting . |
| 3,592,503 | 7/1971 | Lundberg .................... 294/86 R |
| 3,631,995 | 1/1972 | Jones et al. ..................... 294/106 |
| 3,638,817 | 2/1972 | Corompt . |
| 3,648,868 | 3/1972 | Richler . |
| 3,671,016 | 6/1972 | Gladysz ........................... 254/190 |
| 3,744,651 | 7/1973 | Verschoof . |
| 3,817,415 | 6/1974 | Lewis . |
| 3,822,802 | 7/1974 | Evans, Jr. . |
| 3,830,542 | 8/1974 | Lablanche ......................... 296/56 |
| 3,834,565 | 9/1974 | Goodman, Jr. et al. ............. 296/61 |
| 3,848,758 | 11/1974 | Carter ................................ 296/26 |
| 3,863,971 | 2/1975 | Meads et al. ................. 294/67 AA |
| 3,870,356 | 3/1975 | Meads ............................. 294/67 A |
| 3,878,948 | 4/1975 | Corompt . |
| 3,892,323 | 7/1975 | Corompt . |
| 3,964,626 | 6/1976 | Arregui ............................. 414/480 |
| 3,988,035 | 10/1976 | Corompt ............................ 298/12 |
| 4,015,737 | 4/1977 | Wright et al. ...................... 254/3 R |
| 4,054,218 | 10/1977 | Mackey ............................ 280/80 B |
| 4,079,988 | 3/1978 | Randall ............................. 296/57 R |
| 4,089,435 | 5/1978 | Corompt . |
| 4,122,864 | 10/1978 | Tardy et al. ....................... 137/625.6 |
| 4,147,266 | 4/1979 | Corompt ............................ 414/480 |
| 4,278,283 | 7/1981 | Fels ..................................... 296/26 |
| 4,286,346 | 9/1981 | Wiek ................................. 414/477 |
| 4,349,305 | 9/1982 | Wynn et al. ....................... 414/408 |

(List continued on next page.)

FOREIGN PATENT DOCUMENTS

| | | | |
|---|---|---|---|
| 0002056 | 5/1979 | European Pat. Off. ............ | 414/494 |
| 2347691 | 9/1973 | Fed. Rep. of Germany ...... | 414/473 |
| 8303331 | 4/1985 | Netherlands ....................... | 414/491 |

*Primary Examiner*—Michael S. Huppert
*Assistant Examiner*—James Keenan
*Attorney, Agent, or Firm*—Sperry, Zoda & Kane

[57] ABSTRACT

An apparatus for loading a container or other load onto a truck body or trailer and for removal which includes a lower frame secured to the truck during movement and an upper frame pivotally secured with respect to the lower frame to facilitate loading and unloading. The upper frame has one or more rollers secured to an outermost portion thereof. A flexible drive cable is secured at one end to the lower frame and is secured at the other end to the container structure. The cable passes over the roller or rollers and is moved thereby during loading and unloading operations. The cable utilizes no drive other than merely the movement of the roller device with the upper frame which alters the direction of extension of the cable thereby facilitating loading and unloading of the container or load by use of a cable without any winching operation.

19 Claims, 7 Drawing Sheets

U.S. PATENT DOCUMENTS

| | | | |
|---|---|---|---|
| 4,350,469 | 9/1982 | Corompt | 414/420 |
| 4,450,865 | 5/1984 | Tardy | 137/625.6 |
| 4,455,118 | 6/1984 | Scharf | 414/494 |
| 4,548,541 | 10/1985 | Corompt | 414/479 |
| 4,645,405 | 2/1987 | Cambiano | 414/480 X |
| 4,647,270 | 3/1987 | Maloney | 414/470 |
| 4,652,201 | 3/1987 | Boughton | 414/473 X |
| 4,755,097 | 7/1988 | Corompt | 414/499 |
| 4,758,123 | 7/1988 | Corompt | 410/77 |
| 4,762,370 | 8/1988 | Corompt et al. | 298/19 R |
| 4,826,386 | 5/1989 | Corompt | 414/421 |
| 4,842,019 | 6/1989 | Rousset et al. | 137/614.2 |
| 4,848,619 | 7/1989 | Corompt | 414/498 |
| 4,854,221 | 8/1989 | Tardy | 91/420 |
| 4,879,944 | 11/1989 | Tardy et al. | 91/516 |
| 4,900,217 | 2/1990 | Nelson | 414/537 |
| 4,936,032 | 6/1990 | Marcon et al. | 137/599 |
| 4,951,999 | 8/1990 | Rudolph et al. | 298/11 |
| 5,007,792 | 4/1991 | Wiedeck et al. | 414/494 X |

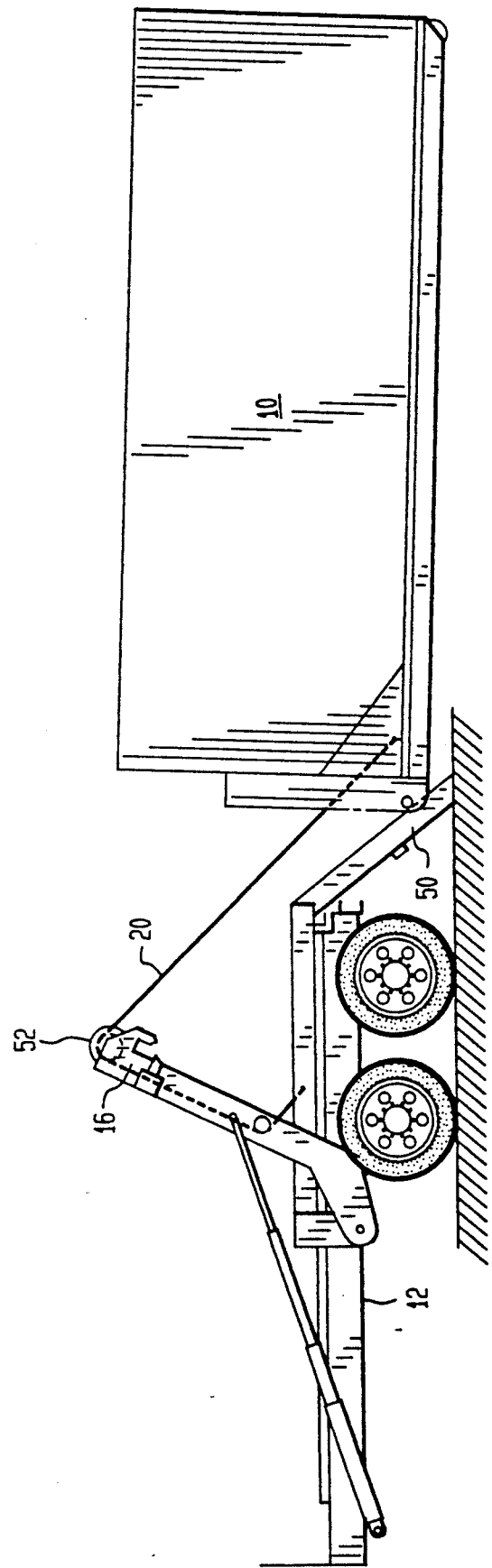

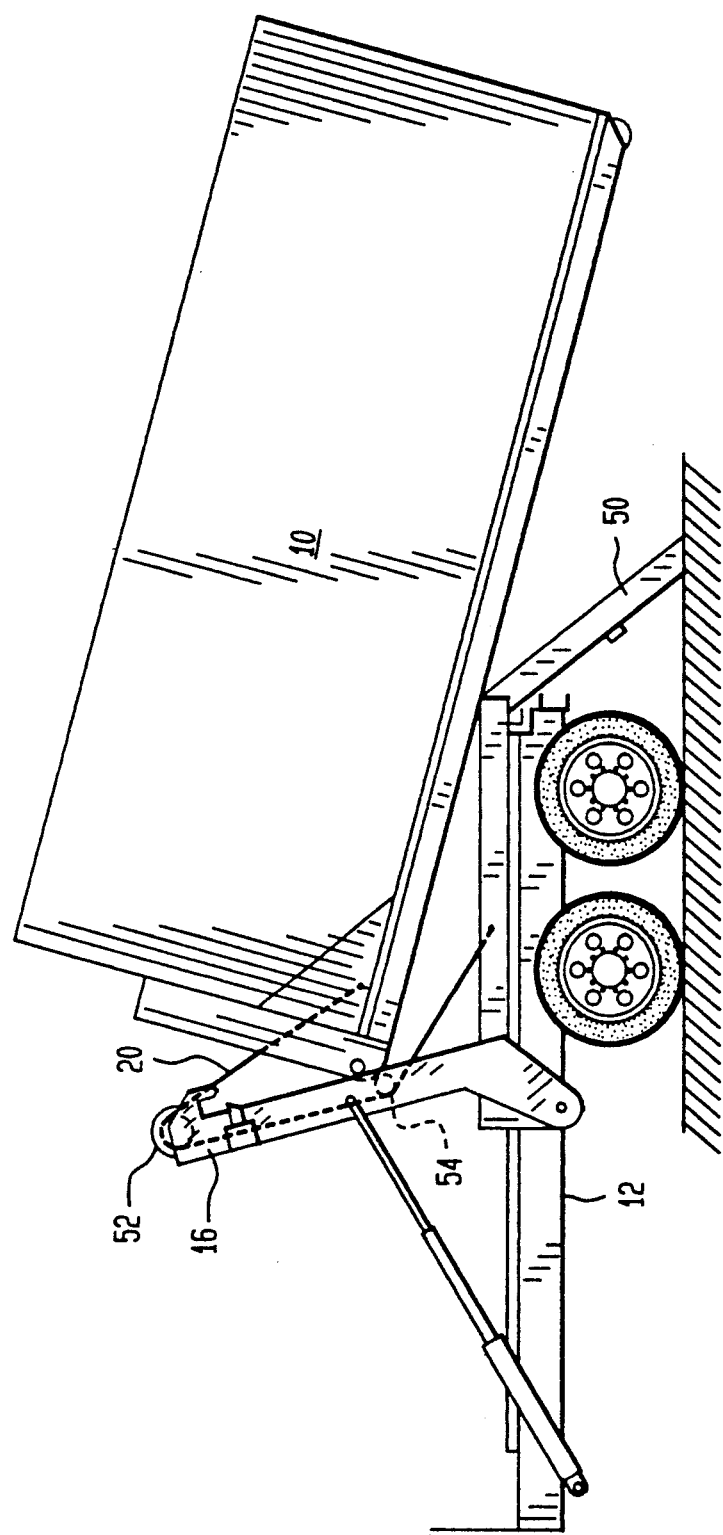

APPARATUS FOR LOADING AND UNLOADING OF A CONTAINER STRUCTURE OR OTHER LOADS WITH RESPECT TO A TRUCK BODY OR TRAILER

BACKGROUND OF THE INVENTION

1. Field Of The Invention

The present invention deals with the field of devices for loading and unloading of containers or skids or other loads upon trucks and/or trailers. The most common use for such a device is for hauling and transporting of trash, scrap, recycling material, sludge or other bulk materials. The loaded container or skid may be lifted upon a truck body or trailer for transportation and/or subsequent dumping or unloading.

There are many uses for a loading and unloading device with respect to a truck or trailer body. The present invention further deals with an apparatus located on the truck or trailer and portable therewith which facilitates the loading and unloading operation of various sized containers or skids with respect to the truck or trailer body. Such loading devices use various types of powering means for urging the container upon the truck or trailer body which may or may not include a cable means as in the present design.

2. Description Of The Prior Art

Many prior art devices have been configured to facilitate the loading and unloading of container structures with respect to truck bodies such as those shown in H. A. Frick et al U.S. Pat. No. 1,919,325 issued Jul. 25, 1933 on a Lift Body For Motor Vehicles; J. W. Filipoff et al U.S. Pat. No. 2,789,715 issued Apr. 23, 1957 on an Interchangeable Truck Body; W. H. Seed U.S. Pat. No. 2,831,588 issued Apr. 22, 1958 on a Freightage Means; D. M. Musson et al U.S. Pat. No. 3,032,217 issued May 1, 1962 on an Apparatus For Facilitating The Mounting Of An Automobile On A Truck; M. Richler U.S. Pat. No. 3,139,289 issued Jun. 30, 1964 on a Tractor With Elevatable Fifth-Wheel; J. Kou U.S. Pat. No. 3,195,956 issued Jul. 20, 1965; P. A. Cresci U.S. Pat. No. 3,259,255 issued Jul. 5, 1966 on a Tilting Body For Motor Vehicles; J. S. Hubbard U.S. Pat. No. 3,322,396 issued May 30, 1967 on a Towing Vehicle; J. W. Hepburn et al U.S. Pat. No. 3,333,715 issued Aug. 1, 1967 on a Self-Unloading Trailer Unit; B. O. Frieberg U.S. Pat. No. 3,404,792 issued Oct. 8, 1968 on a Material Handling Device; A. Corompt U.S. Pat. No. 3,467,268 issued Sep. 16, 1969 on an Apparatus For Handling And Transport Of Heavy Bulky Containers; J. E. Hughey U.S. Pat. No. 3,484,004 issued Dec. 16, 1969 on an Article Handling Device; M. Richler U.S. Pat. No. 3,499,678 issued Mar. 10, 1970 on a Heated Truck Body; J. Whitfield U.S. Pat. No. 3,501,031 issued Mar. 17, 1970 on a Carriage Mechanism For A Load Handling Device; C. Whiting U.S. Pat. No. 3,501,035 issued Mar. 17, 1970 on a Pole Grappling Apparatus With Heel Means And Lateral Stabilizers; J. Lundberg U S. Pat. No. 3,592,503 issued Jul. 13, 1971 on a Swivel-Mounted Grapple Apparatus With Damping Action; J. Jones et al U.S. Pat. No. 3,631,995 issued Jan. 4, 1972 on a Rotatable Grapple With Individually Actuated Outriggers; A. Corompt U.S. Pat. No. 3,638,817 issued Feb. 1, 1972 on a Container Handling And Transporting Device; M. Richler U.S. Pat. No. 3,648,868 issued Mar. 14, 1972 on a Container Transporting Vehicle; W. Gladysz U.S. Pat. No. 3,671,016 issued Jun. 20, 1972 on a Cable Hold-Down Device; J. Verschoof U.S. Pat. No. 3,744,651 issued Jul. 10, 1973 on a Device For Guiding A Body Suspended From Ropes When Lowering Said Body; A. Lewis U.S. Pat. No. 3,817,415 issued Jun. 18, 1974 on a Containerized System For Waste Disposal; E. Evans, Jr. U.S. Pat. No. 3,822,802 issued Jul. 9, 1974 on a Refuse Collector; J. Lablanche U.S. Pat. No. 3,830,542 issued Aug. 20, 1974 on a Movable Tailgate For A Truck; R. Goodman, Jr. et al U.S. Pat. No. 3,834,565 issued Sep. 10, 1974 on a Hydraulic Loading Ramp; J. Carter U.S. Pat. No. 3,848,758 issued Nov. 19, 1974 on a Hydraulic Truck Bed; C. Meads et al U.S. Pat. No. 3,863,971 issued Feb. 4, 1975 on an Adjustable Support For A Material Handling Fork; C. Meads U.S. Pat. No. 3,870,356 issued Mar. 11, 1975 on an Adjustable Material Handling Fork; A. Corompt U.S. Pat. No. 3,878,948 issued Apr. 22, 1975 on a Self-Contained Device For Handling Containers On A Lorry; A. Corompt U.S. Pat. No. 3,892,323 issued Jul. 1, 1975 on a Container-Handling Device For A Self-Loading Vehicle; A. Corompt U.S. Pat. No. 3,988,035 issued Oct. 26, 1976 on a Locking Device, In Particular For A Handling Cranked Arm Mounted On A Vehicle; H. Wright et al U.S. Pat. No. 4,015,737 issued Apr. 5, 1977 on a Bale Mover; J. Mackey U.S. Pat. No. 4,054,218 issued Oct. 18, 1977 on a Tiltable Trailer; F. Randall U.S. Pat. No. 4,079,988 issued Mar. 21, 1978 on an Elevating Tailgate; A. Corompt U.S. Pat. No. 4,089,435 issued May 16, 1978 on Transportation Equipment; M. Tardy et al U.S. Pat. No. 4,122,864 issued Oct. 31, 1978 on a Selective And Proportional Hydraulic Remote Control Device, In Particular For Handling And Public Work Gears; A. Corompt U.S. Pat. No. 4,147,266 issued Apr. 3, 1979 on a Semi-Trailer For Handling And Transporting Standardized Containers; K. Fels U.S. Pat. No. 4,278,283 issued Jul. 14, 1981 on a Load Transport Carriage; E. Wiek U.S. Pat. No. 4,286,346 issued Sep. 1, 1981 on a Boat Slipway For Mobile Or Fixed Set-Up; C. Wynn et al U.S. Pat. No. 4,349,305 issued Sep. 14, 1982 on a Lifting And Dumping Apparatus; A. Corompt U.S. Pat. No. 4,350,469 issued Sep. 21, 1982 on a Handling Device Mounted On A Vehicle To Carry Out The Handling Of Loads Such As Skips And Containers; M. Tardy U.S. Pat. No. 4,450,865 issued May 29, 1984 on a Hydraulic Power Slide Valve, Especially Designed For Public Work Equipment; A. Corompt U.S. Pat. No. 4,548,541 issued Oct. 22, 1985 on a Method And Apparatus For Unloading A Piece of Equipment Placed On A Carrying Vehicle; M. Maloney U.S. Pat. No. 4,647,270 issued Mar. 3, 1987 on a Transporting Unit For Trucks And The Like; A. Corompt U.S. Pat. No. 4,758,123 issued Jul. 19, 1988 on a Multi-Purpose Container Handling Device; A. Corompt U.S. Pat. No. 4,755,096 issued Jul. 5, 1988 on a Device For The Handling And Transfer Of A Load On A Vehicle Such As A Container Or A Tray; A. Corompt et al U.S. Pat. No. 4,762,370 issued Aug. 9, 1988 on a Tipping Device To Control The Tipping Of A Body Mounted On A Vehicle; A. Corompt U.S. Pat. No. 4,826,386 issued May 2, 1989 on a Device For Multi-Directional Tipping Of A Skip Or Container Carried By A Vehicle; A. Rousset et al U.S. Pat. No. 4,842,019 issued Jun. 27, 1989 on a Pressure Compensator Device For Proportional Type Hydraulic Distributor And Hydraulic Distributor Incorporating Same; A. Corompt U.S. Pat. No. 4,848,619 issued Jul. 18, 1989 on a Device For The Handling Of A Container; M. Tardy U.S. Pat. No. 4,854,221 issued Aug. 8, 1989 on a Pilot-Controlled Valve For Braking Or Speed Limitation In A Hydraulic Circuit; M. Tardy et al U.S. Pat. No. 4,879,944 issued Nov. 14, 1989 on a Hydraulic Control Valve; J. Nelson U.S. Pat. No. 4,900,217 issued Feb. 13, 1990 on a Stowable, Multiple Grade Ramping Device; L. Marcon et al U.S. Pat. No. 4,936,032 issued Jun. 26, 1990 on a Safety Valve For Hydraulic Receiver And Hydraulic Circuit Comprising Same; R. Rudolph et al and U.S. Pat. No. 4,951,999 issued Aug. 28, 1990 on a High Lift Dump Truck.

SUMMARY OF THE INVENTION

The present invention provides an improved apparatus for loading and unloading of a container structure or other load with respect to a truck body or trailer which includes a lower frame positioned on the truck body or trailer which is adapted to receive a container structure positioned thereon as needed. An upper frame is pivotally attached with respect to the lower frame through a frame pivot device which is positioned therebetween.

For the purposes of the present application all descriptions with respect to a truck body includes all types of truck body configuration as well as any trailer configuration which basically provides the same purposes of a truck body configuration but which is only detachable from the cab of the truck. Also for the purposes of the present application any description of a container structure also includes a container structure itself, a skid adapted for holding of articles thereon as well as any type of material handling device or load or even merely just the article itself. The apparatus of the present invention is usable for transporting any type of a device which can be moved by truck or trailer means.

An upper frame roller is rotatably mounted on the upper frame device at a location distant from the point of pivotal securement thereof with respect to the lower frame. In this manner the upper frame roller is movable along with the upper frame pivotally with respect to the lower frame.

An extensible arm means such as one or more hydraulic cylinders is pivotally attached at one end thereof with respect to the truck body and at the other end thereof with respect to the upper frame at an intermediate position between the point of pivotal securement and the roller positioned spatially distant outwardly therealong. The extensible arm is longitudinally contractible to facilitate loading of a container structure or skid upon a truck or trailer body and is similarly extensible outwardly to facilitate unloading thereof.

A cable is fixedly secured at one end with respect to the lower frame and extends outwardly about the upper frame roller. This cable is then fixedly attached adjacent the other end with respect to the container structure. In this manner loading and unloading thereof is greatly facilitated merely by extending and retracting of the extensible arm device to urge pivotal movement of the upper frame. Pivotal movement of the upper frame causes a change in the distance between the roller and the point of securement of the cable with respect to the lower frame and the change in the distance between the roller and the point of securement of the cable with respect to the container structure thereby achieving the lifting and movement operation of the container without requiring any external powering means or any winch type device for changing the cable distance. The cable will be merely fixedly secured with respect to the container and the lower frame during movement of the upper frame which greatly minimizes capital costs and provides an easily maintained and a quick and efficient operation device which facilitates loading and unloading of a container structure. Preferably the extensible arm means comprises hydraulic cylinders powered most likely by a fluid such as oil or the like.

In the preferred configuration the lower frame means is also pivotally secured with respect to the truck body to facilitate a dumping operation achieved by pivotal movement about the pivot point of the lower frame rather than about the pivot point of the upper frame. This movement is most likely utilized for dumping operations. On the other hand when the lower frame member is secured with respect to the truck body then pivotal movement of the upper frame member about its pivot axis will achieve the unloading and/or loading operation as desired.

It is an object of the present invention to provide an improved apparatus for loading and unloading of the container structure with respect to a truck or trailer body wherein initial capital cost outlays are minimized.

It is an object of the present invention to provide an improved apparatus for loading and unloading of the container structure with respect to a truck or trailer body wherein maintenance costs are minimized.

It is an object of the present invention to provide an improved apparatus for loading and unloading of the container structure with respect to a truck or trailer body wherein a cable system is provided which does not require a winch device.

It is an object of the present invention to provide an improved apparatus for loading and unloading of the container structure with respect to a truck or trailer body wherein a cable system is provided which does not include a winch system and the powering system required thereby.

It is an object of the present invention to provide an improved apparatus for loading and unloading of the container structure with respect to a truck or tailer body wherein the number of moving parts is minimized to facilitate maintenance.

It is an object of the present invention to provide an improved apparatus for loading and unloading of the container structure with respect to a truck or trailer body wherein significant weight savings in the overall lifting apparatus is achieved.

It is an object of the present invention to provide an improved apparatus for loading and unloading of the container structure with respect to a truck or trailer body wherein down time is minimized.

It is an object of the present invention to provide an improved apparatus for loading and unloading of the container structure with respect to a truck or trailer body wherein various pivot points can be provided between an upper frame and a lower frame to facilitate usefulness with respect to various different sizes of container structures.

It is an object of the present invention to provide an improved apparatus for loading and unloading of the container structure with respect to a truck or tailer body wherein powering of movement is provided by hydraulic cylinders.

It is an object of the present invention to provide an improved apparatus for loading and unloading of the container structure with respect to a truck or tailer body wherein container devices can be loaded/unloaded as well as dumped with a single structure.

It is an object of the present invention to provide an improved apparatus for loading and unloading of the container structure with respect to a truck or trailer body wherein the container structure can be easily fixedly secured with respect to the truck body during transportation thereof.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 6 is a side plan view of an alternative embodiment of the improved apparatus for loading and unloading of a container or other load structure with respect to a truck body or trailer of the present invention shown in the initial stages of loading with the upper frame at approximately 120 degrees with respect to the truck body; and FIG. 7 is an illustration of the alternative embodiment shown in FIG. 6 with the upper frame at approximately 75 degrees with respect to the truck body.

DETAILED DESCRIPTION OF THE PREFERRED EMBODIMENT

Figure 1:
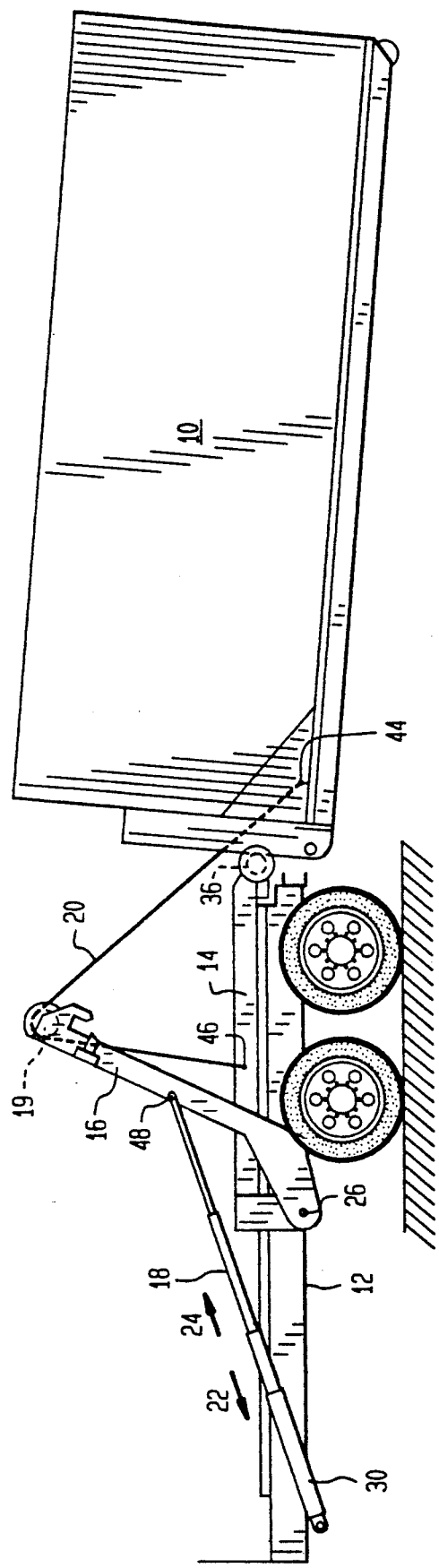
FIG. 1 is a side plan view of an embodiment of the improved apparatus for loading and unloading of a container structure with respect to a truck body of the present invention shown in the initial stages of loading with the upper frame at approximately 120 degrees with respect to the truck body.

The present invention provides an improved apparatus for loading and unloading of a container structure 10 and can comprise a container itself or a skid or material handling device with respect to a vehicle body such as a truck or trailer body 12 shown in initial stages of loading in FIG. 1. The container structure 10 can comprise any type of load which could be loaded upon a trailer or truck body. Normally the truck body 12 is moved backwardly to a position adjacent the container 10 with the lower frame 14 immediately thereadjacent and in particular the abutment end means 36 of the lower frame 14 in abutment with respect to the container structure 10. At this point the upper frame 16 is locked in the horizontally extending position with respect to the truck body 12.

The extensible arm means 18 which preferably may take the form of two hydraulic cylinder members 30 is positioned in the most outwardly extended position normally in the area of 120 to 150 degrees from the rest position. In the outwardly extended position 24 the extensible arm 18 is adapted to hold the upper frame 16 in the upwardly and rearwardly extending position from the frame pivot point 26. In this position the cable means 20 is fixedly secured with respect to the container at attachment point 44. This cable 20 is also fixedly secured with respect to the lower frame at attachment point 46. The cable extends around the outer periphery of the upper frame roller means 19 which is rotatably mounted with respect to the upper frame 16 at a position outwardly therefrom distant from the pivot point of frame pivot means 26.

In order to initiate loading of container 10 the extensible arm means 18 will initiate retracting in the inward direction 22 shown in FIG. 1. Contracting of the arm means 18 will initiate movement of the container structure 10 initially into abutment with respect to the abutment end 36 of lower frame 14 and will exert an inwardly and upwardly directed bias to initiate lifting of the end of the container 10 adjacent the truck body 12.

Figure 2:
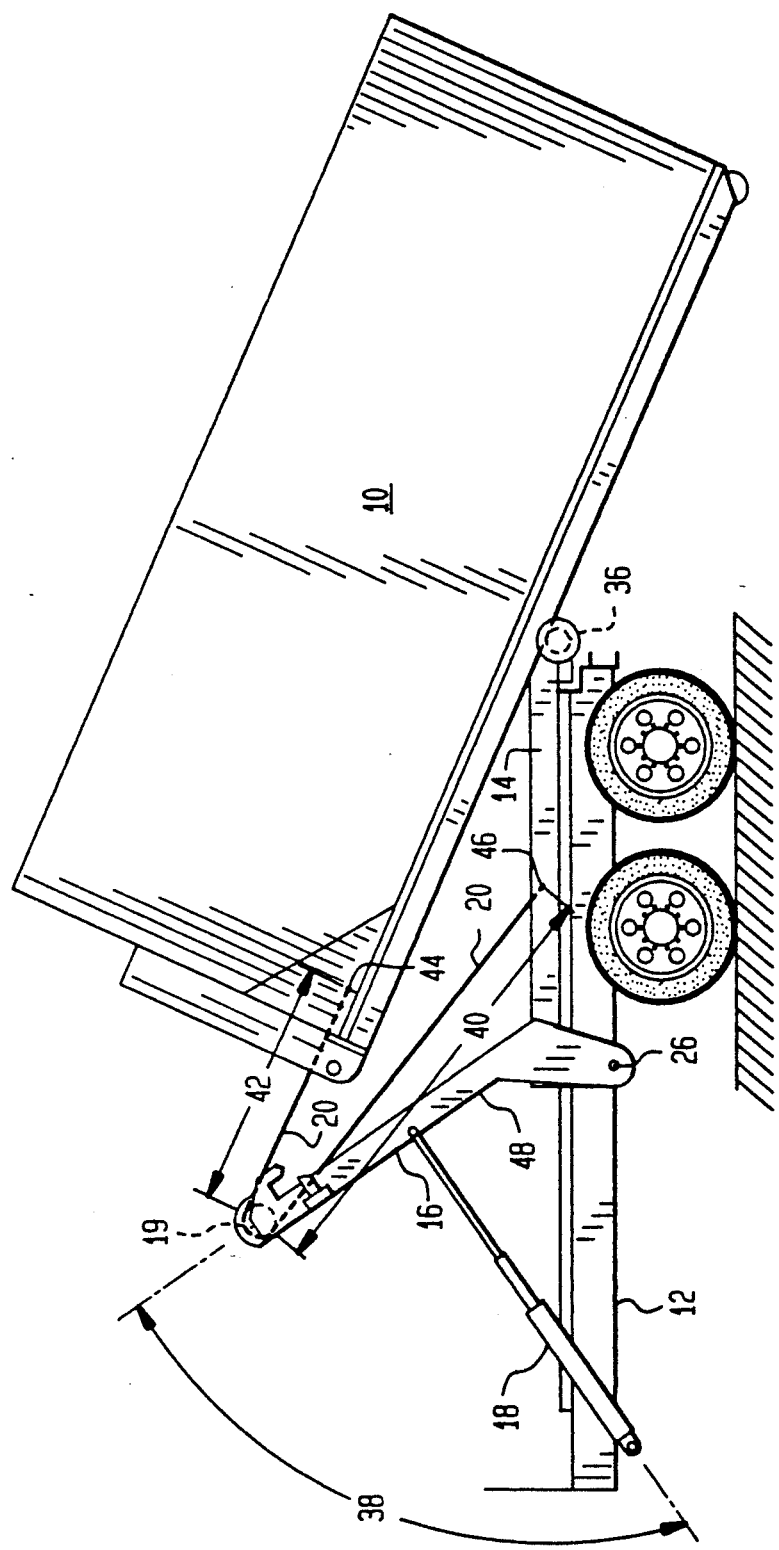
FIG. 2 is an illustration of the embodiment shown in FIG. 1 at a later stage of loading with an angle of approximately 75 degrees.

Since the cable 20 is fixedly secured to the lower frame 14 and to the container structure 10 as the upper frame 16 moves rearwardly the upper frame roller 19 will also move rearwardly causing the urging of movement of container 10 toward the position shown in FIG. 2, partially loaded.

In FIG. 2 we see that the lower portion of container 10 is now in abutment with respect to abutment end means 36 and the upper frame 16 has now moved rearwardly substantially as a result of retracting of extendable arm means 18 in direction 22. As shown in FIG. 2 the upper frame 16 is now approximately 70 degrees with respect to the horizontally extending rest position. The upper frame movement angle 38 as defined in FIG. 2 to be 70 degrees shows the change in the distance between the roller and container attachment 44 and the difference in distance between the roller and the lower frame attachment 40. These distances have changed slightly however the total of these two distances have obviously not changed whatsoever in view of the fact that the cable is tied at both ends.

Figure 3:
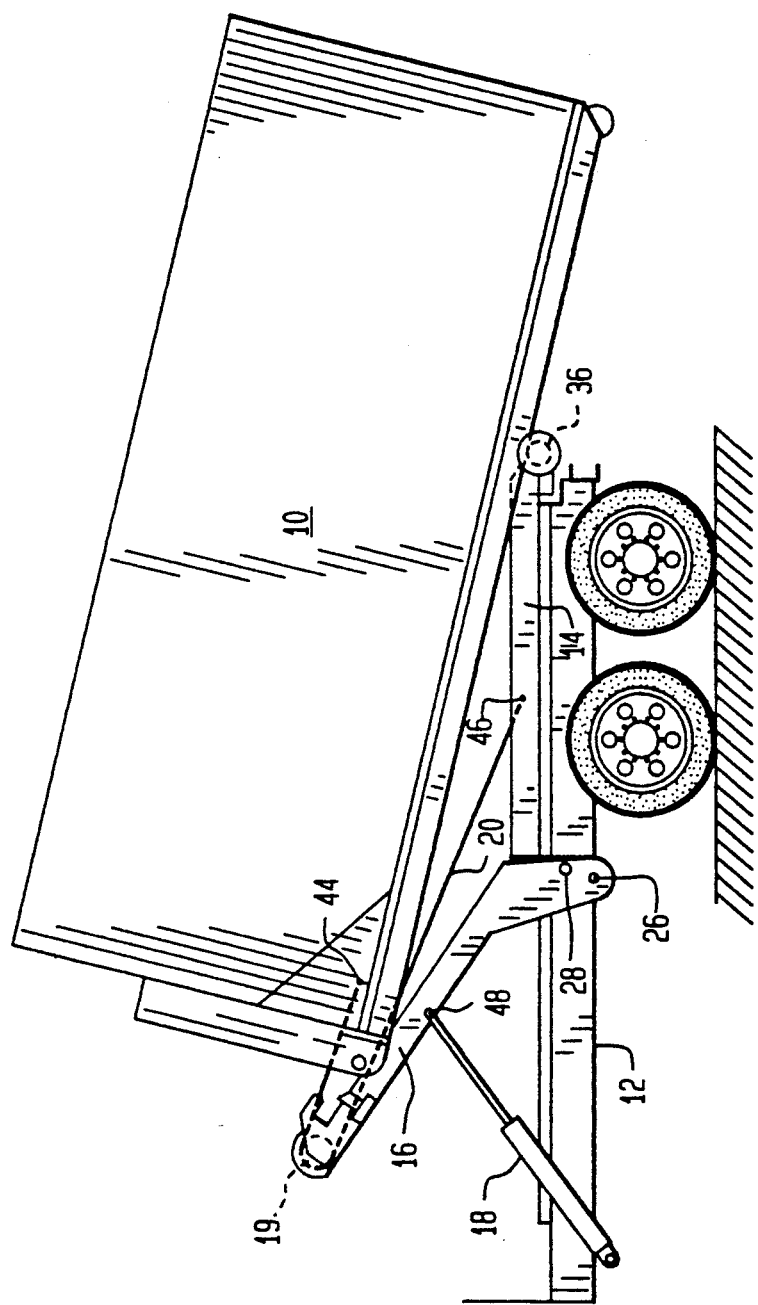
FIG. 3 is an illustration of the embodiment shown in FIG. 1 at a still later stage of loading with the upper frame at an angle of approximately 30 degrees.
Figure 4:
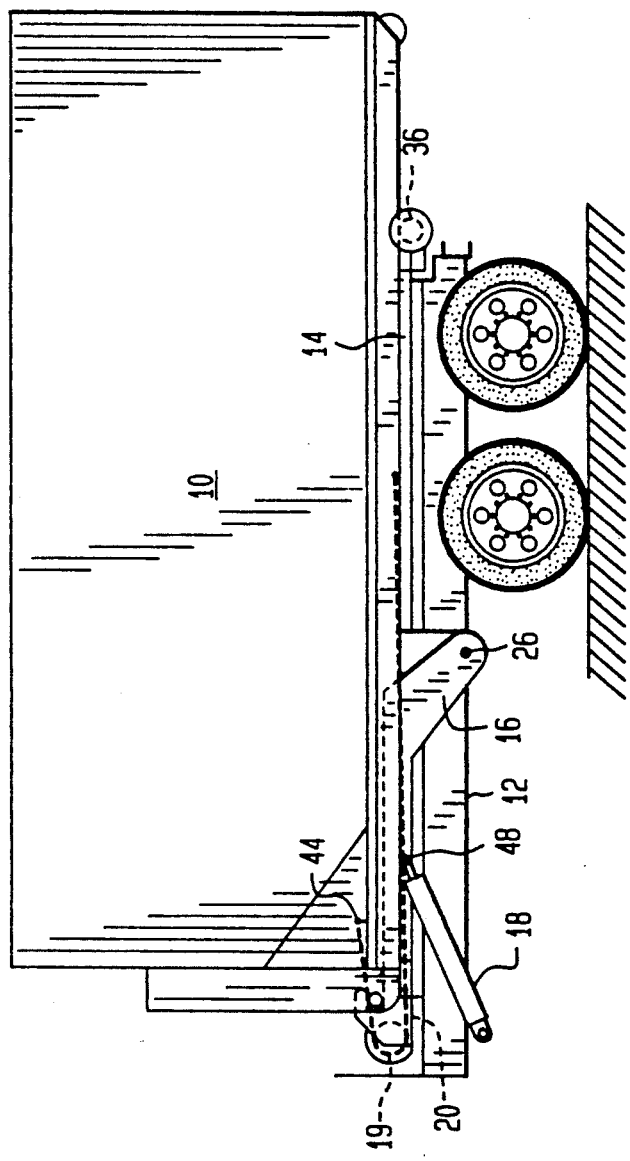
FIG. 4 is an illustration of the embodiment shown in FIG. 1 with the container device in the fully mounted position and the upper frame at 0 degrees.
Figure 5:
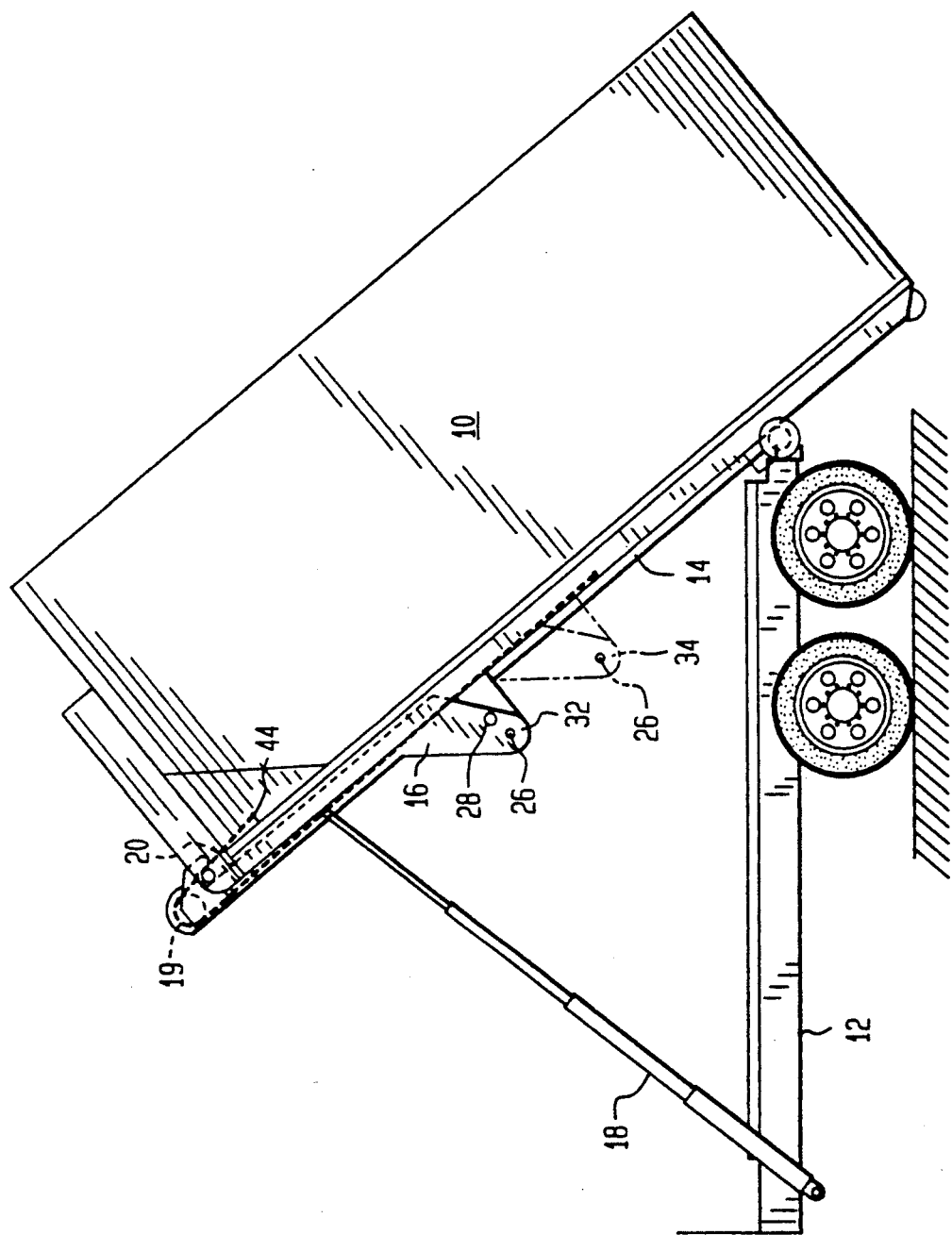
FIG. 5 is an illustration of the embodiment shown in FIG. 1 in the dumping position.

Further rotation of the upper frame 16 through the pivot point of frame pivot 26 causes the container to move to the position shown in FIG. 3 and further contracting of the extensible arm means 18 causes the container 10 to move to the final position shown in FIG. 4. The movement of the upper frame member through the entire angle of possible movement and the movement of the container 10 to the rest position can be controlled by the choice of several different hinge locations shown best in FIG. 5. FIG. 5 shows the first frame hinge 32 and the second frame hinge 34 either of which can be made mobile to facilitate relative movement of the upper frame 16 with respect to the lower frame 14. Also as shown in FIG. 5 a pivot securement means 28 can be used to eliminate pivotal movement of the upper frame 16 with respect to the lower frame 14 as desired.

FIG. 5 shows movement of the extensible arm 18 in the extending or outward direction 24 wherein however rotation between the upper frame 16 and lower frame 14 is prevented. This causes pivotal movement of the container structure 10 with respect to the truck body 12 about the pivot point of the lower frame 14 which was heretofore locked in place with respect to truck body 12. This is only utilized during a dumping operation.

During the unloading operation the movement shown by FIGS. 1, 2, 3 and 4 is performed identically in the reverse order of steps. It should be appreciated that the design of the present invention utilizes a cable driven system which has no winch or winch power means whatsoever. The movement of the container 10 is made possible by movement of the upper frame 16 pivotally with respect to the lower frame 14 as powered by the extensible hydraulic arm means 18. The distance 40 is defined between the upper frame roller 19 and the point of attachment 46 thereof with respect to the lower frame 14. In a similar manner the distance 42 is defined to be the distance between the upper roller 19 and the point of attachment of cable 20 with respect to container 10 at attachment point 44. The total of distances 40 and 41 remain constant during the entire span of motion shown by FIGS. 1 through 4. However the individual distances 40 and 42 will vary but their total distance will always remain constant since the cable is attached at each opposite end. The geometry of this configuration facilitates an easily maintained and yet powerful configuration wherein the movement is achievable by simple and accurately controllable hydraulic power control means evidenced in the hydraulic power cylinders 30 usable as the extensible arm 18.

The configuration of the upper frame 16 must be pivotal with respect to the lower frame 14 about the pivot point of frame pivot means 26. The upper frame roller means 19 must be positioned outwardly from this pivot point. Furthermore the extensible arm 18 must be pivotally secured with respect to the upper frame 16 at an intermediate point 48 between the upper frame roller means 19 and the pivot point of frame pivot means 26.

The apparatus of the present invention has the capability to be used with any type of a container or other load structure which may be mounted with respect to a truck or trailer body. This apparatus is most commonly utilized with waste hauling, however the apparatus would also be usable for movement of anything which may be skid mounted or which can be secured with respect to the cable 20 such as large bulky items like automobiles or heavy machinery.

To further aid in loading FIGS. 6 and 7 show alternative configurations including a ramp means 50 which may be utilized as shown best in FIG. 6 to provide an inclined surface for pulling of the container or other load structure 10 upwardly toward the fully loaded position.

The upper frame roller means 19 may take a variety of different configurations as shown in FIGS. 1-5. Alternatively with the configuration shown in FIGS. 6 and 7 the upper frame roller means 19 can comprise a first roller means 52 and a second roller means 54 which are mounted rotatably with respect to the upper frame means 16. These rollers will normally be positioned at two different distances from the point of rotation of the upper frame 16 with respect to the truck body 12 to thereby facilitate additional control of movement of cable means 20 during loading and unloading operations. This double roller member configuration showing both roller 52 and 54 can be best seen in FIGS. 6 and 7. It is also further possible that more than two rollers may be utilized in order to achieve very fine control of movement of the container or other load structure by accurately controlling movement of the cable means 20 as desired. As such the present invention contemplates the usage of one or more individual rotatably mounted rollers mounted upon the upper frame 16.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. An improved apparatus for loading and unloading of a container with respect to a vehicle body which comprises:
    a) a lower frame means positioned on a vehicle body adapted to receive a container positioned thereon;
    b) an upper frame means pivotally attached to said lower frame means;
    c) a frame pivot means attached to said lower frame means and said upper frame means to allow relative pivotal movement therebetween;
    d) an upper frame roller means rotatably mounted on said upper frame means, said upper frame roller means being pivotally movable along with said upper frame means with respect to said lower frame means;
    e) an extensible arm means pivotally attached adjacent one end thereof to a vehicle body and being pivotally attached adjacent the other end thereof to said upper frame means, said extensible arm means being longitudinally extensible to selectively urge pivotal movement of said upper frame means with respect to the lower frame means as required for loading and unloading of a container with respect to a vehicle body, said upper frame means being movable between a raised position ready to receive a container and a lowered position adapted to retain a container thereon; and
    f) a flexible cable means fixedly attached at one end thereof to said lower frame means and extending around said upper frame roller means, said flexible cable means being fixedly attached adjacent the other end thereof to a container to facilitate loading thereof with respect to a vehicle body responsive to movement of said upper frame means from said raised position to said lowered position by retracting of said extensible arm means, said flexible cable means being fixedly attached adjacent the other end thereof to a container to further facilitate unloading thereof with respect to a vehicle body responsive to movement of said upper frame means from said lowered position to said upper position by extending of said extensible arm means.

2. An improved apparatus for loading and unloading of a container with respect to a vehicle body as defined in claim 1 wherein said extensible arm means is adapted to retract inwardly during loading of a container onto a vehicle body.

3. An improved apparatus for loading and unloading of a container with respect to a vehicle body as defined in claim 1 wherein said extendible arm means is adapted to extend outwardly during unloading of a container from a vehicle body.

4. An improved apparatus for loading and unloading of a container with respect to a vehicle body as defined in claim 1 wherein said upper frame means is located at a position forwardly on a vehicle body relative to the position of said frame pivot means.

5. An improved apparatus for loading and unloading of a container with respect to a vehicle body as defined in claim 1 wherein said extensible arm means includes a power cylinder means for achieving extension thereof.

6. An improved apparatus for loading and unloading of a container with respect to a vehicle body as defined in claim 5 wherein said power cylinder means is hydraulically powered.

7. An improved apparatus for loading and unloading of a container with respect to a vehicle body as defined in claim 6 wherein power cylinder means comprises an oil hydraulic cylinder means.

8. An improved apparatus for loading and unloading of a container with respect to a vehicle body as defined in claim 1 wherein said frame pivot means includes at least two frame hinge means located at different relative positions between said upper frame means and said lower frame means to facilitate loading and unloading of a container with respect to a vehicle body.

9. An improved apparatus for loading and unloading of a container with respect to a vehicle body as defined in claim 1 wherein said lower frame means includes an abutment end means adapted to abut a container during loading thereof upon a vehicle body.

10. An improved apparatus for loading and unloading of a container with respect to a vehicle body as defined in claim 1 wherein said upper frame means is pivotally movable through an angle of approximately 135 degrees.

11. An improved apparatus for loading and unloading of a container with respect to a vehicle body as defined in claim 1 wherein said upper frame means is positionable in a horizontally extending position responsive to a container being loaded upon a vehicle body.

12. An improved apparatus for loading and unloading of a container with respect to a vehicle body as defined in claim 1 wherein said upper frame means is movable from the horizontally extending position through approximately 135 degrees to a rearwardly extending orientation responsive to a container being unloaded.

13. An improved apparatus for loading and unloading of a container with respect to a vehicle body as defined in claim 1 wherein the total of the axial distance along said flexible cable means from the point of attachment to a container around said upper frame roller means to the point of attachment to said lower frame means is maintained constant during loading and unloading of a container.

14. An improved apparatus for loading and unloading of a container with respect to a vehicle body as defined in claim 1 wherein the axial distance along said flexible cable means from said upper frame roller means to the point of attachment to a container varies and the axial distance along said flexible cable means from said upper frame roller means to the point of attachment to said lower frame means varies but the total of these two distances is maintained constant by fixed attachment of said flexible cable means to said lower frame means and to a container.

15. An improved apparatus for loading and unloading of a container with respect to a vehicle body as defined in claim 1 wherein said flexible cable means comprises a steel cable member to facilitate control of movement of a container with respect to a vehicle body.

16. An improved apparatus for loading and unloading of a container with respect to a vehicle body as defined in claim 1 wherein said extensible arm means is pivotally attached to said upper frame means at a position intermediate between said frame pivot means and said upper frame roller means.

17. An improved apparatus for loading and unloading of a container with respect to a vehicle body as defined in claim 1 wherein said upper frame roller means is rotatably mounted on said upper frame means at a position spatially disposed remotely with respect to said frame pivot means.

18. An improved apparatus for loading and unloading of a container with respect to a vehicle body as define in claim 1 wherein said upper frame roller means includes a plurality of individual roller members rotatably mounted to said upper frame means and pivotally movable therewith.

19. An improved apparatus for loading and unloading of a container with respect to a vehicle body which comprises:
 a) a lower frame means positioned on a vehicle body adapted to receive a container positioned thereon, said lower frame means being pivotally movable with respect to a vehicle body to be selectively movable pivotally with respect thereto to facilitate dumping of a container while positioned on a vehicle body, said lower frame means further including an abutment end means adapted to abut a container during loading thereof upon a vehicle body;
 b) an upper frame means pivotally attached to said lower frame means;
 c) a frame pivot means attached to said lower frame means and said upper frame means to allow relative pivotal movement therebetween, said frame pivot means adapted to allow at least approximately 135 degrees of relative freedom of movement between said lower frame means and said upper frame means;
 d) a pivot securement means adapted to restrict pivotal movement of said upper frame means with respect to said lower frame means to facilitate dumping of a container while located upon a vehicle body;
 e) an upper frame roller means rotatably mounted on said upper frame means at a location spatially disposed remotely with respect to said frame pivot means, said upper frame roller means being movable along with said upper frame means pivotally with respect to said lower frame means;
 f) an extensible arm means including a hydraulic cylinder means pivotally attached adjacent one end thereof to a vehicle body and being pivotally attached adjacent the other end thereof to said upper frame means, said extensible arm means being longitudinally extensible inwardly to urge pivotal movement of said upper frame means with respect to said lower frame means as required for loading of a container with respect to a vehicle body and being longitudinally extensible outwardly to urge pivotal movement of said upper frame means with respect to said lower frame means as required for unloading of a container with respect to a vehicle body, said extensible arm means being pivotally attached to said upper frame means at a point intermediate between said frame pivot means and said upper frame roller means to facilitate control thereof, said upper frame means being movable between a raised position ready to receive a container and a lowered position adapted to retain a container thereon; and
 g) a flexible cable means fixedly attached at one end thereof to said lower frame means and extending around said upper frame roller means, said flexible cable means including a steel cable member and being fixedly attached adjacent the other end thereof to a container to facilitate loading thereof with respect to a vehicle body responsive to movement of said upper frame means from said raised position to said lowered position by retracting of said extensible arm means, said flexible cable means being fixedly attached adjacent the other end thereof to a container to further facilitate unloading thereof with respect to a vehicle body responsive to movement of said upper frame means from said lowered position to said upper position by extending of said extensible arm means, the axial distance along said flexible cable means from said upper frame roller means to the point of attachment with respect to a container being variable and the axial distance along said flexible cable means from said upper frame roller means to the point of attachment to said lower frame means being variable, but with the total of these two distances maintained at a constant value by fixed attachment of said flexible cable means to said lower frame means and to a container.

* * * * *